(12) United States Patent
Hafermalz et al.

(10) Patent No.: US 11,447,172 B2
(45) Date of Patent: Sep. 20, 2022

(54) STEERING GEAR AND METHOD FOR PRODUCING THE STEERING GEAR

(71) Applicant: Robert Bosch GmbH, Stuttgart (DE)

(72) Inventors: Jens-Uwe Hafermalz, Waeschenbeuren (DE); Dennis Fuechsel, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/055,751

(22) PCT Filed: Mar. 13, 2019

(86) PCT No.: PCT/EP2019/056208
§ 371 (c)(1),
(2) Date: Nov. 16, 2020

(87) PCT Pub. No.: WO2019/219269
PCT Pub. Date: Nov. 21, 2019

(65) Prior Publication Data
US 2021/0206423 A1  Jul. 8, 2021

(30) Foreign Application Priority Data
May 17, 2018 (DE) ..................... 10 2018 207 766.5

(51) Int. Cl.
*B62D 3/12* (2006.01)
*F16C 17/02* (2006.01)
(Continued)

(52) U.S. Cl.
CPC ................ *B62D 3/12* (2013.01); *F16C 17/02* (2013.01); *F16H 57/021* (2013.01); *F16H 57/039* (2013.01); *F16C 2361/61* (2013.01)

(58) Field of Classification Search
CPC ....... B62D 3/12; B62D 5/0409; F16H 57/021; F16H 57/039
See application file for complete search history.

(56) References Cited

U.S. PATENT DOCUMENTS 9,488,219 B2 * 11/2016 Fuechsel .............. B62D 5/0409
9,534,630 B2 * 1/2017 Hafermalz ........... F16H 57/039
(Continued)

FOREIGN PATENT DOCUMENTS

DE  10 2004 054 510 A1  5/2006
DE  10 2005 035 020 A1  2/2007
(Continued)

OTHER PUBLICATIONS

EPO Translation of the Description of DE 102014218303 A1, Erhardt et al., Mar. 17, 2016. (Year: 2021).*
(Continued)

*Primary Examiner* — Daniel D Yabut
(74) *Attorney, Agent, or Firm* — Maginot, Moore & Beck LLP (57) ABSTRACT

A steering gear for a steering system of a motor vehicle includes a casing, a toothed gear, a pinion that meshes with the toothed gear, and a pinion shaft that comprises the pinion. The pinion shaft is mounted in a fixed bearing which comprises a rotary bearing in which the pinion shaft is received and which is received in a plastic bearing sleeve. The fixed bearing includes a pivot ring, which has outer and inner rings that are pivotably connected via one or more torsion webs. The torsion webs each extend through an opening in the bearing sleeve. The opening is defined by delimiting surfaces in which at least one of those delimiting surfaces is configured to prevent mechanical overloading of the plastic in the region of said delimiting surfaces as a result of contact with the torsion webs that are functionally deformed during the operation of the steering gear.

8 Claims, 4 Drawing Sheets

(51) Int. Cl.
*F16H 57/021* (2012.01)
*F16H 57/039* (2012.01)

(56) References Cited

U.S. PATENT DOCUMENTS

| | | | | |
|---|---|---|---|---|
| 2012/0272765 | A1* | 11/2012 | Fuechsel | F16C 23/06 |
| | | | | 74/416 |
| 2015/0360719 | A1* | 12/2015 | Kang | F01D 25/164 |
| | | | | 384/222 |
| 2016/0097424 | A1* | 4/2016 | Hafermalz | B62D 5/0409 |
| | | | | 74/425 |
| 2017/0096162 | A1* | 4/2017 | Fuechsel | F16H 57/039 |

FOREIGN PATENT DOCUMENTS

| | | |
|---|---|---|
| DE | 10 2008 040 673 A1 | 1/2010 |
| DE | 10 2014 218 303 A1 | 3/2016 |
| DE | 10 2016 121 412 A1 | 5/2018 |
| DE | 10 2017 218 853 A1 | 4/2019 |
| GN | 106321783 A | 1/2017 |
| WO | 2018/095639 A1 | 5/2018 |

OTHER PUBLICATIONS

EPO Translation of CN 106321783 A, Cao et al., Jan. 11, 2017. (Year: 2022).*
International Search Report corresponding to PCT Application No. PCT/EP2019/056208, dated Jun. 21, 2019 (German and English language document) (6 pages).

* cited by examiner

STEERING GEAR AND METHOD FOR PRODUCING THE STEERING GEAR

This application is a 35 U.S.C. § 371 National Stage Application of PCT/EP2019/056208, filed on Mar. 13, 2019, which claims the benefit of priority to Serial No. DE 10 2018 207 766.5, filed on May 17, 2018 in Germany, the disclosures of which are incorporated herein by reference in their entirety.

BACKGROUND

The disclosure relates to a steering gear for a steering system as well as to a corresponding steering system, in particular a power-assisted steering system, for a motor vehicle. The disclosure also relates to a method for producing such a steering gear.

Power-assisted steering systems which while steering generate a supporting torque and, on account thereof, reduce the steering torque to be applied to the steering column by the driver are installed in most motor vehicles.

The known power-assisted steering systems are based on a steering gear which transforms the drive output of a hydraulic or electric steering motor and transmits said drive output to the steering column, for example. Steering gears of this type can be configured in the form of a helical rolling gear and in particular as a helical gear or a worm gear. The latter in this instance comprise a gear wheel which can be connected directly or indirectly to the steering column, as well as a pinion which is driven by the steering motor by way of a shaft and which meshes with said gear wheel.

Play in the gears which is caused by virtue of construction tolerances, different coefficients of thermal expansion of the gear elements and by virtue of wear has proven to be problematic in the case of steering gears of this type. Such play in the gears generates undesirable noises in particular during alternating steering, that is to say when steering takes place by way of successive steering maneuvers in alternating steering directions, said noises resulting from opposite flanks of the teeth of the pinion and the gear wheel bearing on one another in an alternating manner.

It is known for such play in the gears to be eliminated as far as possible in that the pinion shaft is mounted so as to be pivotable about an axis which runs so as to be perpendicular to the longitudinal axis of the pinion shaft and at a spacing from the meshing engagement between the pinion and the gear wheel and which is pressed against the gear wheel by means of one or a plurality of spring elements. The pivotability of the pinion shaft herein is typically integrated in one of the two mountings by way of which the pinion shaft is mounted at the ends thereof. This mounting is also referred to as the "fixed bearing". The mounting in the region of the other end in this instance is embodied so as to have a defined play (so-called "floating bearing"; cf. DE 10 2005 035 020 A1, for example), so as to enable the deflection which is associated with such a pivoting movement. The fixed bearing is typically provided so as to be proximal to the drive while the floating bearing is provided at the free end of the pinion shaft. The spring element or elements for pressing the pinion onto the gear wheel herein can be integrated in the floating bearing as well as in the fixed bearing.

Such a steering gear in which the spring force for the spring action is generated by means of the fixed bearing is known from DE 10 2008 040 673 A1, for example. In the case of this steering gear it is provided that a ball bearing which receives the pinion shaft in the region of the fixed bearing is mounted externally in a pivot sleeve. The pivot sleeve comprises a bearing sleeve which receives the ball bearing largely without play, and an outer ring which is held largely without play in a receptacle of a housing of the steering gear, wherein the outer ring and the bearing sleeve are connected by way of a plurality of torsion webs which are twisted when the outer ring is rotated in relation to the bearing sleeve. After the assembly of the steering gear the torsion webs are twisted in such a manner that the elastic restoring action generated on account thereof causes the spring action on the pinion shaft.

A steering gear in which inter alia a bearing sleeve of the fixed bearing that receives the outer ring of the ball bearing as well as the inner ring of a pivot ring, the latter besides the inner ring also comprising an outer ring and torsion webs which connect the outer ring and the inner ring, is configured from plastics material is described in the as yet unpublished German patent application 10 2017 218 853.7. It is preferably provided herein that all of the components which are received within the bearing sleeve, and consequently also the inner ring of the pivot ring, are integrated in the bearing sleeve by overmolding in the context of an injection-molding process. Such an approach leads to portions of the torsion webs also being embedded in the plastics material from which the bearing sleeve is configured. Since the torsion webs are intended to functionally deform in the operation of the steering gear, embedding said torsion webs in the plastics material of the bearing sleeve leads to significant local stresses in the plastics material which can lead to rupturing and in the long term thus to a failure of the bearing sleeve.

The disclosure is based on the object of avoiding the set of issues which results from the design embodiment of a steering gear as described in the German patent application 10 2017 218 853.7.

SUMMARY

This object is achieved by means of a steering gear according to the disclosure. A method for producing such a steering gear is also disclosed. Advantageous design embodiments of the steering gear according to the disclosure and preferred embodiments of the method according to the disclosure are the subject matter of the further patent claims and/or are derived from the description hereunder of the disclosure.

Provided according to the disclosure is a steering gear for a steering system of a motor vehicle which has at least one housing, a gear wheel, a pinion, in particular a helical pinion, which meshes with the gear wheel, and a (helical) pinion shaft which comprises the pinion.

The pinion shaft on one side of the pinion is mounted in a fixed bearing which comprises a rotary bearing in which the pinion shaft is received. The rotary bearing to this end comprises at least one inner bearing ring and one outer bearing ring as well as, optionally in the case of a preferred design embodiment as a roller bearing and in particular as a ball bearing, a plurality of roller elements, in particular balls, which are disposed between the bearing rings. The pinion shaft is received within the inner bearing ring of the rotary bearing. The rotary bearing, and in particular an outer bearing ring of the rotary bearing of the fixed bearing, is furthermore received in a bearing sleeve. The fixed bearing moreover comprises a pivot ring which has an outer ring as well as an inner ring which by way of a plurality (in particular two) torsion webs are pivotally connected to one another, wherein the inner ring is received in the bearing sleeve and the outer ring is mounted within the housing of the steering gear and therein is in particular disposed to as to be fixed (in terms of at least one, preferably in terms of all directions, that is to say so as to be immovable).

The bearing sleeve is at least partially, preferably completely, configured from plastics material (in particular from one or a plurality of thermoplastic plastics materials, preferably at least partially having a fiber reinforcement). On account thereof, a simple production capability for the bearing sleeve, or the entire fixed bearing, respectively, and thus for the steering gear can be implemented, on the one hand. Moreover, as a result of the design embodiment from plastics material the bearing sleeve can be distinguished by a relatively minor component weight. According to a method according to the disclosure herein, at least the bearing sleeve of such steering gear can be preferably configured by injection-molding from plastics material, or be configured as an injection-molded part, respectively.

In order to avoid a relatively high local loading of the plastics material of the bearing sleeve as a result of a functional deformation of the torsion webs in the region of the steering gear, it is moreover provided according to the disclosure that the torsion webs extend in each case through an opening in the bearing sleeve, wherein at least one of those delimitation faces which in terms of the longitudinal axis of the bearing sleeve delimits the opening in the axial direction
- is disposed so as to be spaced apart from the torsion web received therein; and/or
- has a (mean) radial width which is smaller than the mean radial width across the circumference of that axial portion of the (entire) bearing sleeve in which this delimitation face lies; the at least one delimitation face which in terms of the longitudinal axis of the bearing sleeve delimits the opening in the actual direction herein can preferably have the smallest radial width of that axial portion of the bearing sleeve in which this delimitation face lies. The "radial width" is to be understood as the dimension of the delimitation faces in the radial direction in terms of the longitudinal axis of the bearing sleeve.

It can be achieved on account of corresponding spacings between the torsion webs and at least the axial delimitation faces of the openings which receive said torsion webs that the torsion webs in the operation of the steering gear can functionally deform without any contact arising with these delimitation faces. In the case of a correspondingly small dimension of said spacings it can however also be the case that contact arises with the delimitation faces in the event of a relatively major deformation of the torsion webs, wherein the stresses in the plastics material of the bearing sleeve generated by this contact are however only minor, on account of which any overloading of the plastics material can also be precluded in the long term.

The voids which are fundamentally configured on account of the spacing between the torsion webs and the respective assigned delimitation faces can remain vacant or be at least temporarily filled, in particular with a material which is dissimilar from the material which configures the bearing sleeve at least in the region of the delimitation faces. Temporarily filling these voids can in particular be provided in the context of the production of the bearing sleeve, in particular by means of injection-molding, so as to prevent material flowing into the provided voids, or so as to configure the spacings between the torsion webs and the respective assigned delimitation faces, respectively. The material which is received in the voids can be removed after the production of the bearing sleeve so as to expose the voids for the operation of the steering gear. However, said material if sufficiently flexible and in particular sufficiently elastic, may also remain between the torsion webs and the delimitation faces since said material in this instance transmits the loading resulting from the deformation of the torsion webs only to a relatively minor extent to the delimitation faces and thus to the material of the bearing sleeve.

In the case of the relatively small radial width of the delimitation faces, which is likewise possible according to the disclosure, it can also be provided that said delimitation faces contact the torsion webs also in the non-deformed state of the latter, wherein the relatively small radial width of the delimitation faces leads to a sufficiently high elasticity of the bearing sleeve in this region such that this region of the bearing sleeve, conjointly with the torsion webs, can be deformed in the operation of the steering gear without this leading to the plastics material being overloaded.

According to the disclosure, at least one, and preferably at least both, of the delimitation faces, which delimit the opening in the axial direction is/are disposed so as to be spaced and/or embodied having a relatively small radial width, since the distances by way of which the torsion webs are deformed can be significantly larger in the axial direction (by virtue of corresponding bending of the torsion webs) than in the circumferential direction (by virtue of twisting of the torsion webs). Consequently, there is typically no risk of overloading the plastics material of the bearing sleeve in the circumferential direction as a result of a deformation of the torsion webs, even when the delimitation faces there, which are dimensioned having a relatively large radial width, too contact the torsion webs in the non-loaded state.

In principle, however, it is also possible for those delimitation faces which delimit the openings in the circumferential direction of the bearing sleeve to be disposed so as to be correspondingly spaced, and/or to be embodied having a relatively small radial width. However, this can be associated with significant additional complexity, in particular in the case of the preferred production of at least the bearing sleeve by injection-molding.

The pinion shaft of a steering system according to the disclosure can preferably be mounted in a floating bearing on the other side of the pinion, said floating bearing comprising a rotary bearing in which the pinion shaft is received, wherein radial mobility within the housing is guaranteed for the rotary bearing (and thus also for the end of the pinion shaft received therein). It can preferably be provided that the rotary bearing, and in particular an outer bearing ring thereof, is received in a bearing bush which is received within the housing in such a manner that radial mobility of the rotary bearing and thus of the end of the pinion shaft received therein within the housing is guaranteed.

Such a floating bearing can have a design embodiment according to DE 10 2005 035 020 A1, for example. It can be provided in particular that the bearing bush of the floating bearing has an inner bush which receives the rotary bearing and an outer bush which surrounds the inner bush and is fixedly disposed in the housing, wherein the outer bush and the inner bush delimit an annular gap, and wherein the outer bush and the inner bush are connected to one another by way of the flexible connection portion in such a manner that said outer bush and said inner bush are movable relative to one another at least in a radial direction.

Alternatively, the bearing bush can also be designed in such a manner that said bearing bush is connected to a detent element, or per se is configured as a detent sleeve, said detent element or detent sleeve being disposed so as to be displaceable within a receptacle space of the housing and simultaneously secured against rotation therein, wherein the pivotability of the pinion shaft, said pivotability being guided by the fixed bearing, being delimited by a detent action between the detent element or the detent sleeve and a preferably cylindrical wall of the receptacle space, wherein the detent element or the detent sleeve, on the one hand, and the receptacle space, on the other hand, are configured in such a manner that a pivotability of the pinion shaft about an axis which is aligned so as to be perpendicular to the pivot axis is additionally blocked only in the case of such a detent action resulting from the interaction of contact faces of the detent element or of the bearing sleeve and the wall of the receptacle space which contact one another in this instance.

The rotary bearing of the floating bearing of the steering gear according to the disclosure comprises at least one inner bearing ring and one outer bearing ring as well as, optionally in the case of a preferred design embodiment as a roller bearing and in particular as a ball bearing, a plurality of roller elements, in particular balls, which are disposed between the bearing rings, wherein the pinion shaft is received within the inner bearing ring and herein preferably directly contacts the latter. The outer bearing ring can preferably be received in a directly contacting manner within the bearing bush of the floating bearing.

Such a steering gear according to the disclosure can furthermore preferably be characterized in that the bearing sleeve and/or an outer bearing ring of the rotary bearing of the fixed bearing is connected, or interacts, respectively, directly or indirectly (for example by way of a bearing bush of the floating bearing) with an outer bearing ring of the rotary bearing of the floating bearing by way of a connection element which can be configured in one part or a plurality of parts. The connection element herein can in particular be configured in such a manner that said connection element transmits at least a load which leads to tilting of the outer bearing ring of the rotary bearing of the fixed bearing directly or indirectly to the outer bearing ring of the rotary bearing of the floating bearing. It can be achieved on account thereof that the restoring torque of the elastically twisting torsion webs of the pivot ring of the fixed bearing is transmitted to the pinion shaft no longer exclusively by way of the rotary bearing of the fixed bearing, in order for said pinion shaft to be pressed against the gear wheel, but that the pivot load of the bearing sleeve of the fixed bearing that results from the restoring torque is additionally, or primarily, respectively, transmitted by way of the connection element to the rotary bearing of the floating bearing and thus to the end of the pinion shaft that is mounted in the latter. In conjunction with contact between the pinion and the gear wheel, said contact being between the fixed bearing and the floating bearing, a loading on the rotary bearings that is aligned so as to be substantially radial and is caused by the restoring torque of the twisted torsion webs results. A transmission of a tilting torque of a relevant size from the rotary bearings, and in particular from the rotary bearing of the fixed bearing, to the pinion shaft can be avoided on account thereof. This advantageously enables the rotary bearing of the fixed bearing and/or the rotary bearing of the floating bearing to be dimensioned relatively small, this potentially also having a positive effect in terms of the size and the weight as well as in terms of the production costs of a steering gear according to the disclosure. Furthermore, a rotary bearing of relatively simple design embodiment in terms of construction, preferably a single-row radial ball bearing, can be chosen for the fixed bearing and/or the floating bearing, this potentially also having a positive effect in terms of the size and the weight as well as in terms of the production costs of a steering gear according to the disclosure.

The bearing bush which is provided for mounting the rotary bearing of the floating bearing can preferably also be configured by the connection element per se.

According to one preferred design embodiment of a steering gear according to the disclosure having a connection element it can be provided that the connection element is at least partially configured so as to be tubular. It can in particular be provided that the connection element is configured so as to be tubular across the entire length thereof and herein surrounds the pinion shaft, wherein an (optionally single) opening disposed in the region of the pinion is provided in the tubular casing of the connection element, said opening extending across part of the circumference and part of the length of the tubular casing and enabling the pinion to engage with the gear wheel. Such a tubular connection element in flexural terms is relatively rigid in relation to the weight of the component, this enabling an advantageous transmission of a pivoting load from the bearing sleeve and/or the outer bearing ring of the rotary bearing of the fixed bearing to the floating bearing.

In one design embodiment of a steering gear according to the disclosure which for reasons of production technology is particularly advantageous it can be provided that the connection element is configured so as to be integral to the bearing sleeve (that is to say said connection element and said bearing sleeve are at least directly connected to one another) and preferably in one piece (that is to say said connection element and said bearing sleeve are not connected to one another by way of separate connection elements), in particular also in a materially integral manner. It can accordingly be particularly preferably provided that the entity of the bearing sleeve and the connection element is configured as an integral component from one or a plurality of plastics material, in particular from one single plastics material. This component herein can in particular be injection-molded in the context of a method according to the disclosure.

In the case of such a design embodiment of a steering gear according to the disclosure it can in particular also be provided in this instance that the rotary bearing of the floating bearing is mounted directly or indirectly within an (end) portion of the connection element and a (same or other) portion of the connection element is mounted directly or indirectly within the (in this instance separate) bearing bush of the floating bearing. This can lead in particular to such a steering gear according to the disclosure being able to be assembled with relative ease.

In the context of a method according to the disclosure which is characterized in that at least the bearing sleeve is configured from plastics material by injection molding it can furthermore preferably be provided that the bearing sleeve is demolded in the axial direction, that is to say by moving tool parts of the injection-molding tool used therefor along the longitudinal axis of the bearing sleeve. It can furthermore preferably be provided herein that, to the extent provided, the spacing between the torsion webs and the at least one delimitation face of the respective associated opening through which the torsion webs extend is configured by a radially movable slide of the injection-molding tool or by a casting core from a material which is dissimilar to the material of the bearing sleeve. Such a casting core herein can also be provided in such a manner that said casting core permanently remains in the voids which are fundamentally configured on account of the spacing between the torsion webs and the delimitation faces. A relatively small radial width of this at least one delimitation face, which the bearing sleeve of a steering gear according to the disclosure can likewise have, can however be configured by a cavity of the injection-molding tool which locally is of a correspondingly (small) dimension.

In a production of the bearing sleeve and/optionally also of the connection element as (an) injection-molded component(s) an asymmetrical design embodiment can have a negative effect since said asymmetrical design embodiment can lead to a correspondingly asymmetrical distortion of the injection molded part or parts as a result of the curing and the cooling of the plastics material. In order for this to be avoided, it can preferably be provided that the transverse cross-sectional faces, or the radial cross-sectional faces, respectively, of the bearing sleeve and/or of the connection element to the extent possible are configured so as to be rotationally symmetrical, but at least largely, preferably precisely, symmetrical with respect to a point in terms of the (respective or common) longitudinal axis. Rotationally symmetrical cross-sectional faces in the case of the bearing sleeve can be implemented substantially across the entire longitudinal extent. Cross-sectional faces which are not rotationally symmetrical and optionally not even symmetrical with respect to a point have to be optionally provided only in that region in which the torsion webs are routed through the casing face of the bearing sleeve. Since this herein is however only a relatively small portion of the longitudinal extent of the bearing sleeve, this may be unproblematic in terms of any distortion of the bearing sleeve. However, an opening through which a meshing engagement of the toothings of the pinion and the gear wheel is enabled can be problematic in the case of the connection element. In order to obtain at least a symmetry with respect to a point in this optionally relatively long portion of the longitudinal extent of the connection element, it can be provided that the connection element in this portion of the longitudinal extent thereof not only has an opening which enables the meshing engagement but additionally an opening which is of preferably identical configuration but in terms of the longitudinal axis is offset by 180° in the circumferential direction. The connection element in this longitudinal portion is in this instance configured by two connection ties which in terms of the longitudinal axis are offset by 180° in the circumferential direction and are preferably disposed so as to be symmetrical with respect to a point and which can in each case also be composed of a plurality of sub-ties. It can preferably be provided herein that the connection ties are configured in the shape of partially cylindrical shell members.

For a design embodiment of the bearing sleeve and optionally also of the connection element which is preferably connected to the bearing sleeve in an integral manner which is advantageous in terms of meeting loads it can be provided that reinforcement ribs which run in the longitudinal direction are configured on the external sides of said bearing sleeve/said connection element. The reinforcement ribs herein can preferably be disposed in the circumferential direction on the entire external side of the bearing sleeve and/or of the connection element, and/or so as to be at a uniform pitch in the circumferential direction.

According to a furthermore preferred design embodiment of a steering gear according to the disclosure it can be provided that the bearing sleeve configures an encircling shoulder on which an axial end of an outer bearing ring of the rotary bearing of the fixed bearing is directly or indirectly supported. A relatively simple production capability and/or assembly capability for such a steering gear according to the disclosure can in particular be implemented on account thereof.

According to one preferred refinement of such a steering gear according to the disclosure it can moreover be provided that the internal diameter of the shoulder on the periphery which is proximal to the rotary bearing is larger than the internal diameter of the outer bearing ring on the periphery which is proximal to the shoulder and/or is larger than the internal diameter on the periphery of a preferably disk-shaped annular element which is disposed between the outer bearing ring and the shoulder, said periphery being proximal to said shoulder. It can in particular be avoided on account thereof in the context of a production of a functional group which comprises at least the rotary bearing of the fixed bearing, the pivot ring, and the bearing sleeve of the fixed bearing, as well as optionally also the ring element, that plastics material invades the rotary bearing when the bearing sleeve is configured by injection-molding, wherein at least the outer bearing ring of the rotary bearing and the inner ring of the pivot ring are partially embedded in the plastics material.

It can particularly preferably be provided that the bearing sleeve configures two encircling shoulders on which one axial end of the outer bearing ring of the rotary bearing is in each case supported (directly or indirectly, in the latter instance in particular by way of the inner ring of the pivot ring). Accordingly, a functional group which is composed at least of the outer bearing ring of the rotary bearing, the inner ring of the pivot ring, and preferably one or a plurality of ring elements, can in this instance be advantageously disposed so as to be axially immovable between the encircling shoulders of the bearing sleeve. This is able to be advantageously implemented by producing the bearing sleeve by injection-molding while simultaneously over molding, or while simultaneously embedding, respectively, this functional group in the plastics material. A particular advantage which can result from such a design embodiment of the fixed bearing of a steering gear according to the disclosure lies in that pre-tensioning can be generated on account of a shrinkage of the bearing sleeve as a result of curing and cooling of the plastics material, said pre-tensioning acting on the functional group in the axial and/or radial direction, on account of which the components of this functional group contact one another as well as the internal side of the bearing sleeve without play. An otherwise unintentional noisy behavior of the steering gear when in operation, caused by such play, can accordingly be avoided without particular measures in terms of construction being necessary to this end.

The annular member of the ring element or ring elements can optionally have an L-shaped longitudinal sectional face so as to implement a relatively high load bearing capability in the axial direction. The ring element, or one of the ring elements, can also be the inner ring of the pivot ring.

The disclosure also relates to a steering system which comprises at least one steering gear according to the disclosure as well as a steering motor which in a rotating driving manner is connected to the pinion shaft. The gear wheel of the steering gear can furthermore be connected in a rotationally fixed manner or in a rotating driving manner to a steering shaft, in particular a steering column, of the steering system. The steering system according to the disclosure can in particular be configured as a power-assisted steering system in which a supporting torque can be generated by means of the steering motor such that a steering torque to be applied for steering the motor vehicle to the steering column by a driver of a motor vehicle comprising the power-assisted steering system is reduced (optionally temporarily even to zero). Alternatively thereto, there is also the possibility of configuring the steering system in such a manner that the entire steering torque required for steering is at all times generated by the steering motor so as to in particular implement a so-called steer-by-wire functionality of the steering system, or of the motor vehicle, respectively, in which there is no mechanical connection between a steering handle (to the extent that the latter is even still provided) and the steerable wheels.

The disclosure furthermore relates to a motor vehicle having a steering system according to the disclosure.

The indefinite articles ("a", "an", "of a" and "of an"), in particular in the patent claims and in the description that generally discusses the patent claims, are to be understood as such and not as numerals. Components discussed in concrete terms using these are thus to be understood as being present at least singly, and as being capable of being present in a multiplicity.

BRIEF DESCRIPTION OF THE DRAWINGS

The disclosure will be explained in more detail hereunder by means of exemplary design embodiments which are illustrated in the drawings. In the drawings.

DETAILED DESCRIPTION

Figure 1:
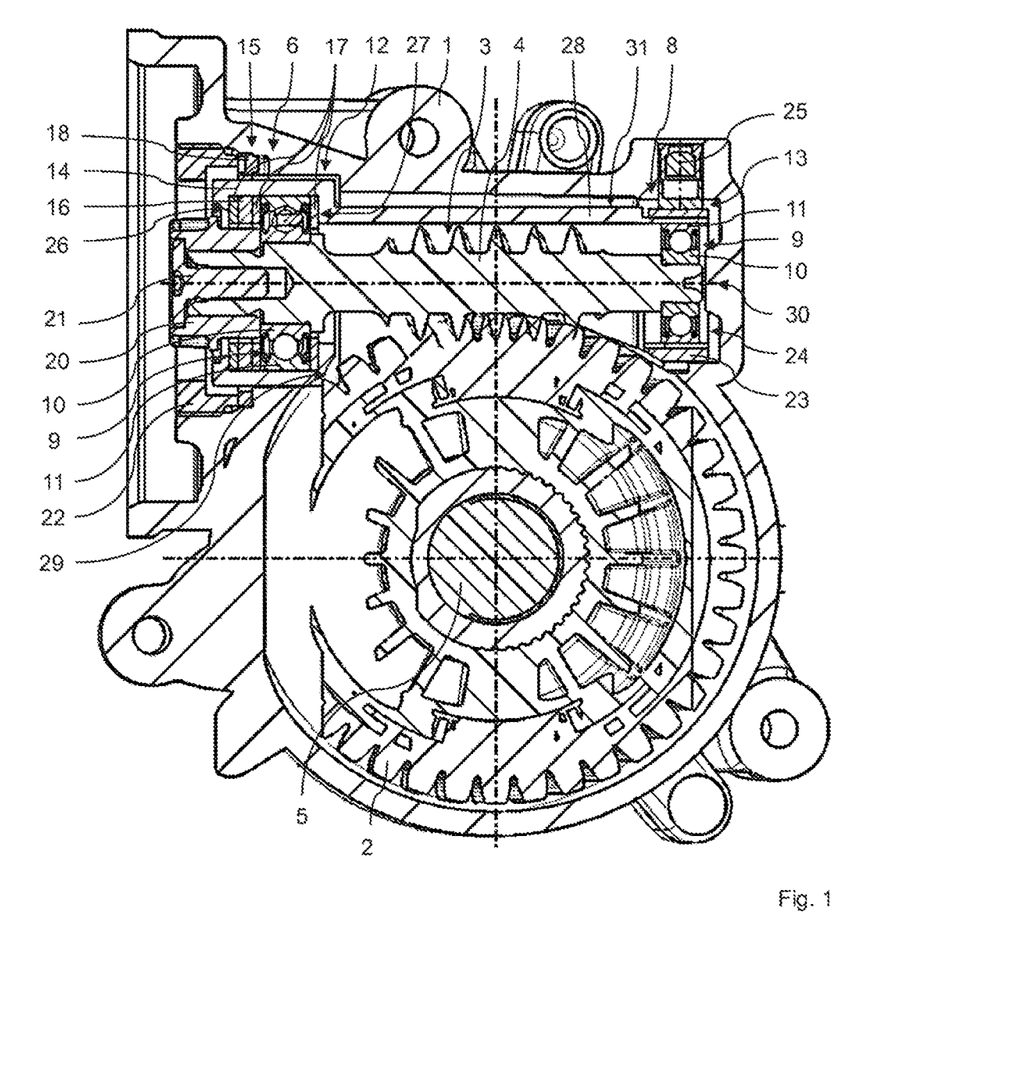
FIG. 1 shows a longitudinal section through a steering gear according to the disclosure, according to a first design embodiment.

FIG. 1 shows the substantial component parts of a steering gear according to the disclosure. Said steering gear comprises a housing 1, a gear wheel 2 as well as a pinion 3 which in the form of a helical pinion meshes with said gear wheel 2 being rotatably disposed within said housing 1. The pinion 3 and a (helical) pinion shaft 4 which comprises the pinion 3 are integrally configured in the form of a worm.

The gear wheel 2 is fixedly fastened on an output shaft 5 of the steering gear. This output shaft 5, which in the exemplary design embodiment shown has a toothing for a reliable rotationally fixed connection to the gear wheel 2, can mesh with a steering rack which at least in a portion is configured as a toothed rack, on account of which the toothed rack carries out a translatory movement which in a manner known by way of wheel control arms (not illustrated) can be converted to a pivoting movement of steerable wheels (not illustrated). The output shaft 5 can however also be a steering column of a power-assisted steering system, said steering column being connected to a steering wheel and acting on the steering rack by way of a steering pinion.

The pinion shaft 4 has a drive-proximal end by way of which said pinion shaft 4 is able to be connected to the output shaft of a steering motor (not illustrated; for example an electric motor). In the region of this drive-proximal end, the pinion shaft 4 by means of a first mounting is mounted in the housing 1. This mounting is configured as a fixed bearing 6 which permits pivoting of the pinion shaft 4 about a pivot axis 7 (cf. FIGS. 2 and 6). This pivot axis 7 herein runs so as to be approximately perpendicular to the drawing plane in FIG. 1. Such pivoting causes the end of the pinion shaft 4 that is opposite the drive-proximal end to deflect, said pinion shaft 4 there being mounted within the housing 1 by means of a floating bearing 8. This floating bearing 8 is configured such that said floating bearing 8 permits the deflection of said end that results from the pivoting of the pinion shaft 4.

The fixed bearing 6 as well as the floating bearing 8 comprise in each case one rotary bearing in the form of a ball bearing 9. The corresponding portions of the pinion shaft 4 are mounted in inner bearing rings 10 of these ball bearings 9, while outer bearing rings 11 of the ball bearings 9 are in each case mounted in a bearing device 12, 13, said bearing devices 12, 13 in turn being received in the housing 1. The bearing devices 12, 13 in terms of construction are configured such that said bearing devices 12, 13 in the case of the fixed bearing 6 permit the pivoting of the pinion shaft 4 about the pivot axis 7, and in the case of the floating bearing 8 permit the deflection of the free end of the pinion shaft 4.

To this end the bearing device 12 of the fixed bearing 6 comprises a bearing sleeve 14 having circular cross sections which on the inside, in a first longitudinal portion, receives the associated ball bearing 9, and in a second longitudinal portion receives an inner ring 16 of a pivot ring 15. This inner ring 16 of the pivot ring 15 and the outer bearing ring 11 of the ball bearing 9 while interposing a plurality of ring elements 17 are mounted so as to be axially secured within the bearing sleeve 14, wherein the inner ring 16 while interposing in each case one ring element 17 is supported on the outer bearing ring 11 of the ball bearing 9, on the one hand, and on a first encircling shoulder 26 which the bearing sleeve 14 configures at an axial end, on the other hand. In the same way, the side of the outer bearing ring 11 of the ball bearing 9 which is distal in relation to the inner ring 16 of the pivot ring 15, while interposing an annular element 17, is supported on a second encircling shoulder 27 which the bearing sleeve 14 configures at this axial end.

The pivot ring 15, besides the inner ring 16, also comprises an outer ring 18. This outer ring 18 by way of two torsion webs 19 (cf. FIGS. 2 and 6) is connected to the inner ring 16. The outer ring 18, the inner ring 16, and the torsion webs 19 are preferably configured so as to be integral from spring steel, for example.

Axially securing the position of the inner bearing ring 10 of the ball bearing 9 of the fixed bearing 6 on the pinion shaft 4 takes place while interposing a pressure piece 20 by means of a screw 21 which is screwed into an internal thread which is integrated in the drive-proximal end of the pinion shaft 4. Axially securing the position of the outer ring 18 of the pivot ring 15 within the housing 1 takes place by means of a screw ring 22 which has an external thread which is screwed into an internal thread of the housing 1.

The two torsion webs 19 define the position of the pivot axis 7 about which the outer ring 18 is pivotable relative to the inner ring 16 of the pivot ring 15. The torsion webs 19 of the pivot ring 15 herein not only enable the outer ring 18 to be pivoted in relation to the inner ring 16 and thus the pinion shaft 4 to be pivoted relative to the gear wheel 2, or to the housing 1, respectively, but simultaneously cause the spring force by way of which the pinion 3 is pressed into the toothing of the gear wheel 2 so as to achieve an ideally minor play in the gears and thus an ideally minor generation of noise in the operation of the steering gear, in particular in the case of steering in alternating directions. This spring force results from the pinion shaft 4 as a result of contact with the gear wheel 2 when assembling the steering gear being deflected so far that sufficient twisting of the torsion webs 19 results, on account of which the elastic restoring torques which result from this twisting of the torsion webs 19 act counter to the deflection of the pinion shaft 4 and said restoring torques thus impinge the gear wheel 2.

The bearing device 13 of the floating bearing 8 comprises a detent element in the form of a detent sleeve 23 which is disposed so as to be movable within a receptacle space 24 configured by the housing 1 in such a manner that the pivotability about the pivot axis 7 defined by the fixed bearing 6 is possible within the limits of a basic play defined by the construction. This basic play, or this pivotability, respectively, in one direction is delimited by full contact, or contact which arises in each case on two flanks of the individual teeth of the pinion 3 and the gear wheel 2, respectively, said contact being caused by the spring loading by means of the twisted torsion webs 19, and in the other direction is delimited by a detent action which is configured on account of contact between the circular detent sleeve 23 and the detent element 25 which is disposed in a receptacle opening of the housing 1. The depth by which the detent element 25 protrudes into the receptacle space 24 herein can be adjustable at least once.

The steering gear furthermore comprises a connection element 28 which is connected to the bearing sleeve 14 of the fixed bearing 6 so as to be in one piece with the latter and in a materially integral manner thereto, or is configured as an extension of said bearing sleeve 14, respectively. The connection element 28 is fundamentally tubular having cross sections which are annular or in the shape of annular segments, wherein said connection element 28 has a casing opening 29 which is disposed in a centric portion of the connection element 28 and which extends across a portion of the circumference of said connection element 28. A portion of the gear wheel 2 can protrude through this casing opening 29 into the internal volume that is delimited by the connection element 28 and the internal volume which receives the pinion shaft 4 in the portion that inter alia receives the pinion 3, so as to enable the toothings of the gear wheel 2 and of the pinion 3 to mesh.

A tubular end portion of the connection element 28 extends into the floating bearing 8 of the steering gear, wherein the ball bearing 9 of the floating bearing 8 with the associated outer bearing ring 11 is mounted so as to be axially movable within this end portion of the connection element 28. This end portion of the connection element 28 in turn is mounted on the inside in the detent sleeve 23 of the floating bearing 8. The connection element 28, conjointly with the detent sleeve 23, accordingly configures a bearing bush for the ball bearing 9 of the floating bearing 8.

By means of the connection element 28 it is caused that the elastic restoring torques which result from the torsion of the torsion webs 19 of the pivot ring 15 of the fixed bearing 6 are not transmitted to the pinion shaft 4 exclusively by way of the ball bearing 9 of the fixed bearing 6, which would be associated with a relatively high tilting load of this ball bearing 9, on the one hand. Rather, these elastic restoring torques are transmitted to the ball bearing 9 of the floating bearing 8 primarily by way of the bearing sleeve 14 of the fixed bearing 6 and the connection element 28 which is integrally connected to the latter.

The bearing sleeve 14 of the fixed bearing 6 and the connection element 28 which is configured so as to be integral to the bearing sleeve 14 are configured in the form of an injection-molded component from a plastics material, in particular a thermoplastic plastics material. In the production of this entity composed of the bearing sleeve 14 and the connection element 28 by injection molding, the ball bearing 9 of the fixed bearing 6, the pivot ring 15, and the total three ring elements 17 are partially overmolded by the plastics material used herein. To this end, the inner bearing ring 10 of the ball bearing 9, the inner ring 16 of the pivot ring 15, and the two ring elements 17 in contact with this inner ring 16 are pushed onto a graduated portion of a first casting core (not illustrated). A second casting core (not illustrated), which is provided in particular for configuring the internal volume of the tubular connection element 28, at an end portion having a reduced diameter supports the third ring element 17 and at the end side impacts the end of the inner bearing ring 10 of the ball bearing 9 that is distal in terms of the pivot ring 15. After positioning the casting cores and the components supported by the latter, that is to say the ball bearing 9, the pivot ring 15, and the ring elements 17, within a cavity of an injection-molding tool (not illustrated) the free-flowing plastics material can be incorporated into the injection-molding tool and cured in the latter when additionally using a radially movable slide (not illustrated) by way of which the casing opening 29 of the connection element 28 is configured. The sprue herein can preferably take place in an annular manner in the region of one of the axial ends of the injection-molded component to be produced, or by way of a plurality of injection points which are distributed across the circumference of the injection-molded component, or of the cavity of the injection-molding tool, respectively. A central sprue (fan gate or diaphragm gate, for example) is also possible. On account of the internal diameter of the shoulders 26, 27 configured by the bearing sleeve 14 being larger than the internal diameters of the respective ring elements 17 bearing thereon (relating in each case to the proximal periphery), an invasion of the free-flowing plastics material into the ball bearing 9 is avoided during the injection-molding process.

Shrinking of the bearing sleeve 14 takes place as a result of the curing and the cooling of the plastics material, the mutually contacting assembly of the outer bearing ring 11 of the ball bearing 9, of the inner ring 16 of the pivot ring 15, and of the three ring elements 17 on account thereof being radially and axially elastically impinged, on account of which a freedom of play which has an advantageous effect on the noise behavior of the steering gear in operation is implemented.

The molding of the functional group which is composed of the ball bearing 9 of the fixed bearing 6, the pivot ring 15, the ring elements 17, and the entity of the bearing sleeve 14 and the connection element 28 can take place in the axial direction in terms of the longitudinal axis 30 once the slide which is provided for configuring the casing opening 29 has been retracted.

The detent sleeve 23 of the floating bearing 8 is likewise composed of a thermoplastic plastics material which however is softer or more elastic, respectively, in comparison to the plastics material from which the entity of the bearing sleeve 14 and the connection element 28 is configured. On account thereof, a generation of noise as a result of contact with the detent element 25 during the operation of the steering gear is to be damped. The detent sleeve 23 can be separately produced, for example likewise by means of injection-molding, and can be subsequently placed onto the corresponding end portion of the connection element 28 and be connected to the latter. Alternatively however, there is also the possibility of producing the detent sleeve 23 and the entity of the bearing sleeve 14 and the connection element 28 in the form of an integral injection-molded component by way of a bi-component injection-molding process.

A plurality of reinforcement ribs 31 are configured so as to be distributed at a uniform pitch in the circumferential direction across the respective external face on the external side of the bearing sleeve 14 as well as on the external side of the connection element 28, said reinforcement ribs 31 extending in the longitudinal direction of the bearing sleeve 14, or of the connection element 28, respectively, and specifically running so as to be parallel to the longitudinal axis 30. The reinforcement ribs 31 of the bearing sleeve 14 herein extend into the end side of the bearing sleeve 14 that is distal in terms of the connection element 28, as well as into the end side that is proximal in terms of the connection element 28 and represents the encircling shoulder on the external side which is configured in the transition between the bearing sleeve 14 and the connection element 28. The reinforcement ribs 31 run radially in these end sides. The reinforcement ribs 31 of the bearing sleeve 14 and of the connection element 28 which mutually transition in each case in pairs, are in particular intended to guarantee a relatively high flexural stiffness and at the same time a relatively low component weight of the entity of the bearing sleeve 14 and the connection element 28.

Figure 2:
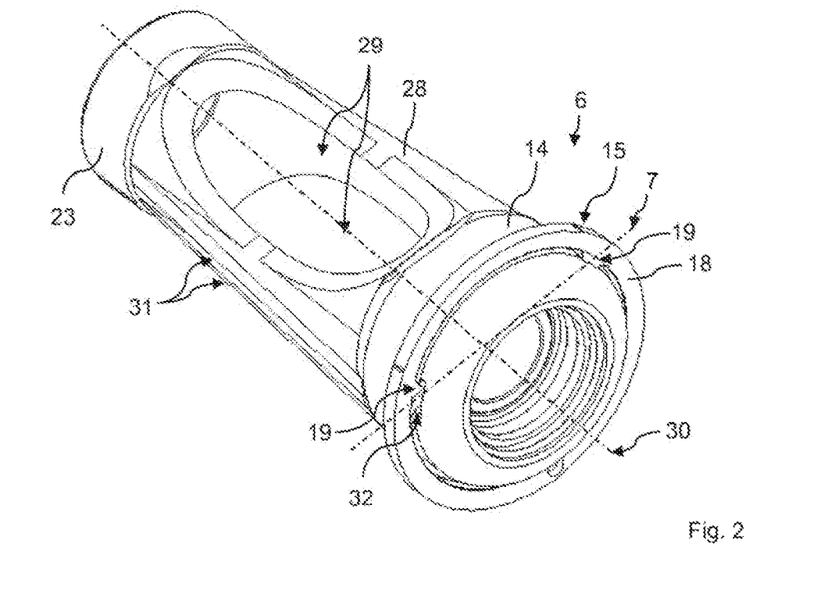
FIG. 2 shows a first alternative design embodiment of a functional group comprising a fixed bearing and a connection element which for a steering gear according to the disclosure is configured so as to be integral to a bearing sleeve of the fixed bearing, in a perspective view.
Figure 3:
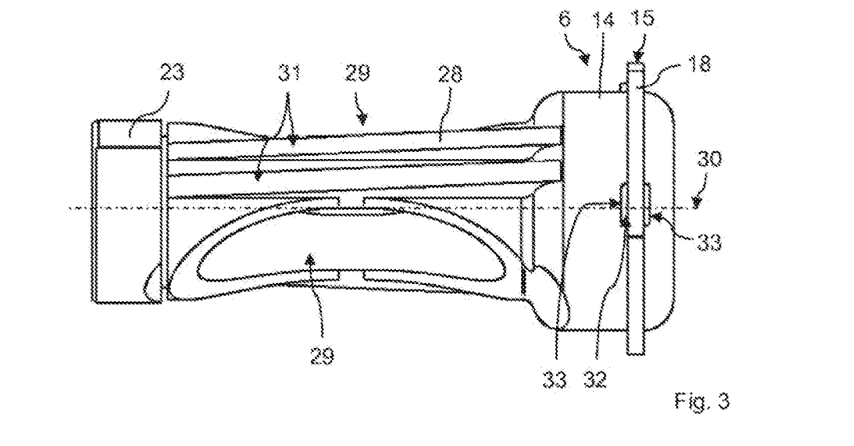
FIG. 3 shows the functional group according to FIG. 2 in a lateral view.

A functional group composed of a fixed bearing 6, the connection element 28, and a detent sleeve 23 for a steering gear according to the disclosure is in FIGS. 2 and 3, said steering gear otherwise being potentially configured according to FIG. 1, for example. This functional group differs from the corresponding functional group according to FIG. 1 in that in the longitudinal portion in which the connection element 28 configured as a (casing) opening 29 which enables the pinion 3 and the gear wheel 2 to mesh, is configured with cross-sectional faces which are symmetrical with reference to a point. This is achieved in that the connection element 28 in this longitudinal portion comprises a casing opening 29 which is shaped so as to be identical to the mentioned casing opening 29 and lies opposite the latter. The casing of the connection element 28 in this longitudinal portion is consequently reduced to 2 connection ties which have identical dimensions and in terms of the longitudinal axis 30 are disposed so as to be offset by 180° in the circumferential direction, or are disposed so as to be mutually opposite, respectively. These connection ties also have reinforcement ribs 31 on the external side.

Figure 4:
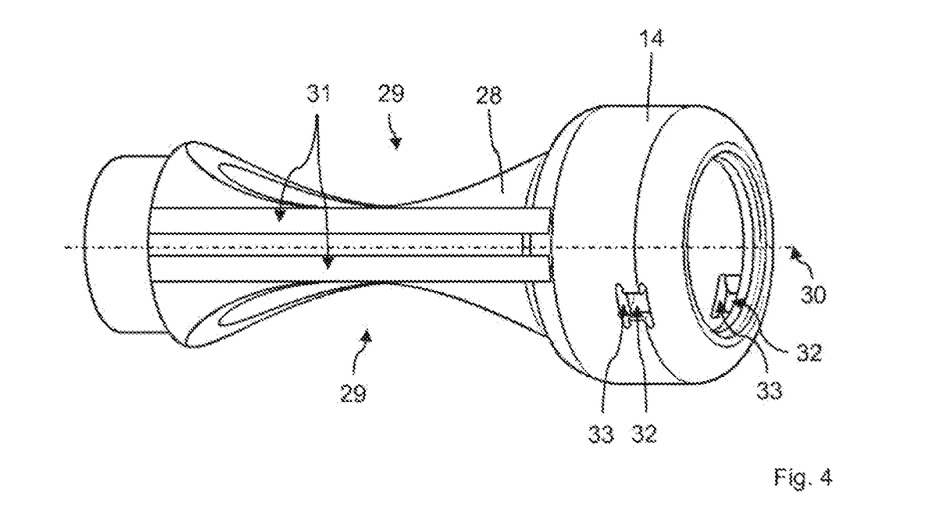
FIG. 4 shows the bearing sleeve and the connection element, configured so as to be integral to the former, of the functional group according to FIGS. 2 and 3 in a perspective view.

As is the case in the bearing sleeve 14 according to FIG. 1 (this not being visible therein), it is also provided in the bearing sleeve 14 according to FIGS. 2 to 4 that the torsion webs 19 extend in each case through an opening 32 in the bearing sleeve 14, on account of which said torsion webs 19 can connect the inner ring 16, which is received within the bearing sleeve 14, and the outer ring 18 of the pivot ring 15, which is received outside the bearing sleeve 14. It is provided according to the disclosure herein that the two delimitation faces 33 which delimit in each case the openings 32 in the axial direction are disposed so as to be spaced apart from the torsion web 19 received therein. On account thereof, the torsion webs 19 can deform in the operation of a steering gear which comprises the functional group without contact taking place between the torsion webs 19 and these delimitation faces 33. Mechanical overloading of the plastics material of the bearing sleeve 14 in the regions configuring these delimitation faces 33 can be avoided on account thereof.

As can be derived from FIG. 4, the openings 32 which in the bearing sleeve 14 receive the torsion webs 19 are configured so as to be approximately H-shaped. The two portions of these H-shaped openings 32 that run vertically, or in the circumferential direction, respectively, in the context of the production of the bearing sleeve 14 are configured by means of slides of the injection-molding tool (not illustrated) which is used for injection-molding the bearing sleeve 14 and of the connection element 28 which is connected to the latter. Alternatively thereto, these portions of the openings 32 can however be kept free by casting cores from a material which is dissimilar to the material of the bearing sleeve 14. The central portion, or the axially running portion, respectively, of the H-shaped openings 32 however is in each case kept free by the torsion webs 19 per se. Accordingly, the delimitation faces 33 which delimit the openings 32 in the circumferential direction contact the correspondingly adjacent external faces of the torsion webs 19. There is however no risk of mechanical overloading of the plastics material of the bearing sleeve 14 there since the functional deformation of the torsion webs 19 in the operation of the steering gear is associated only with very minor deformation distances in the circumferential direction. These deformation distances are relevant in terms of size only in the axial direction, this being primarily because the toothing forces as a result of the design embodiment of the pinion 3 as a helical pinion also act in the axial direction of the pinion shaft 4, this axial component of the toothing forces leading to corresponding bending of the torsion webs 19.

Figure 6:
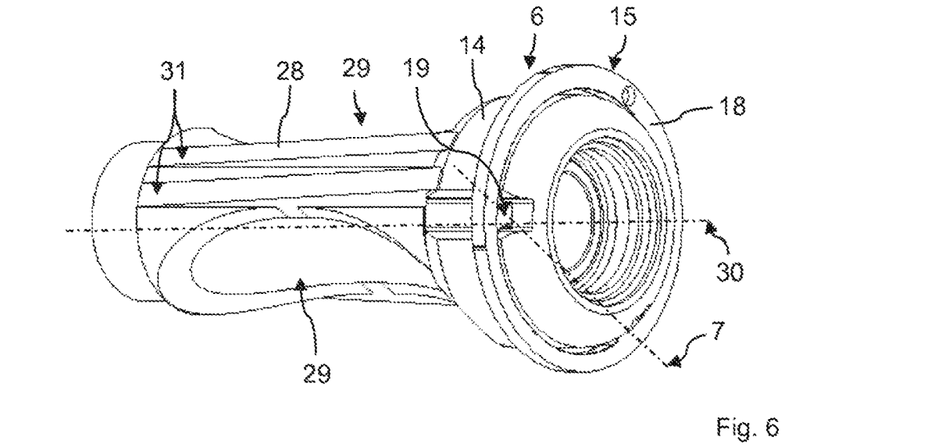
FIG. 6 shows a second alternative design embodiment of a functional group comprising a fixed bearing and a connection element which for a steering gear according to the disclosure is configured so as to be integral to a bearing sleeve of the fixed bearing, in a perspective view.
Figure 7:
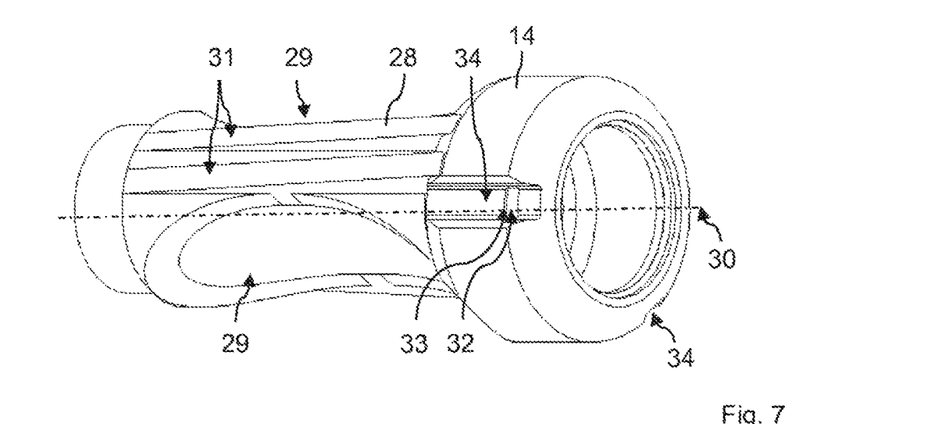
FIG. 7 shows the bearing sleeve and the connection element, configured so as to be integral to the former, of the functional group according to FIG. 6 in a perspective view.

FIGS. 6 and 7 show a functional group for a steering gear according to the disclosure according to a second alternative design embodiment which in turn comprises a fixed bearing 6 and a connection element 28 which is configured so as to be integral to a bearing sleeve 14 of the fixed bearing 6. A detent sleeve 23 which is likewise part of this functional group and corresponds to that according to FIGS. 2 and 3 is not illustrated in FIGS. 6 and 7. The functional group according to FIGS. 6 and 7 fundamentally corresponds to that according to FIGS. 2 to 4. The only differences between these functional groups lie in the design embodiment of the openings 32 which receive the torsion webs 19 and in constructive details which result from the manner how these openings 32 have been generated in the context of the production of the bearing sleeve 14 by injection-molding.

The openings 32 of the bearing sleeve 14 according to FIGS. 6 and 7 have in each case a rectangular shape (cf. in particular FIG. 7), wherein all of the delimitation faces 33 which delimit these openings 32 contact the adjacent external faces of the torsion webs 19. Overloading the plastics material of the bearing sleeve 14 that configures these delimitation faces 33, in particular as a result of deformation of the torsion webs 19 in the axial direction in the operation of a steering gear which comprises the functional group, is avoided in that the radial width of the delimitation faces 33 which delimit the openings 32 in the axial direction is relatively small in comparison to the radial width, or the wall thickness, respectively, of the bearing sleeve 14 in the other circumferential portions of the portions, or cross-sectional faces, respectively, which comprise these delimitation faces 33. The regions of the bearing sleeve 14 that configure these delimitation faces 33 on account thereof have a relatively high elasticity and can therefore be readily (conjointly) deformed by the torsion webs 19 which are deformed in the operation of the steering gear without any mechanical overloading of the plastics material there being associated therewith.

The relatively small radial width of the delimitation faces 33 which delimit the openings 32 in the axial direction is achieved in the context of the production of the bearing sleeve 14, or of the functional group, respectively. The injection-molding tool (not illustrated) utilized to this end is configured in two parts (plus two slides which are provided for configuring the casing openings 29 and are received within one of the tool parts), wherein the separation plane between the two tool parts runs in the region of the pivot ring 15. Two protrusions which run so as to be parallel to the longitudinal axis 30 of the bearing sleeve 14 are provided on the mold face of each tool part that configures the external side of the bearing sleeve 14, wherein a protrusion on the inside of each of the two tool parts is disposed so that the two protrusions are in mutual alignment and so as to be axially adjacent to one of the torsion webs 19. On account thereof, these two protrusions configure in each case a depression 34 which runs in the axial direction in the external side of the bearing sleeve 14.

Figure 8:
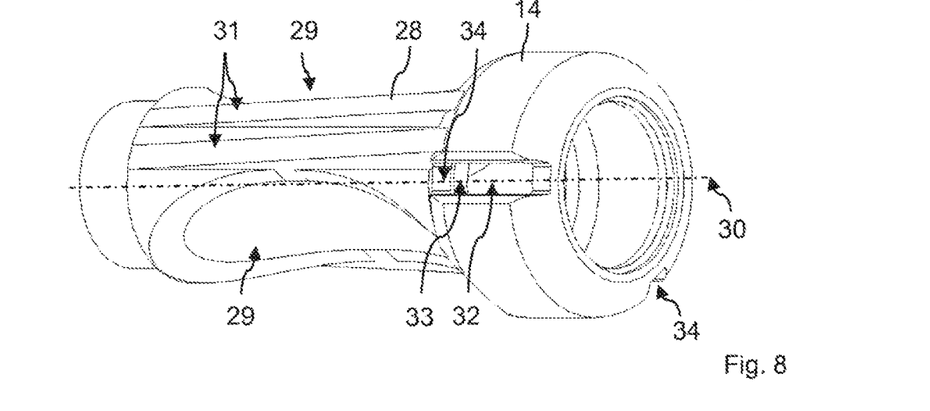
FIG. 8 shows an alternative design embodiment of the bearing sleeve for a functional group according to FIG. 6 in a perspective view.

FIG. 8 shows a component which in an integral manner comprises a bearing sleeve 14 and a connection element 28, wherein this component, with the exception of dissimilar axial widths of the openings 32 which are provided for receiving the torsion webs 19, corresponds to that according to FIGS. 6 and 7. On account of a corresponding dimensioning of the bearing sleeve 14 on the inside, openings 32 of which the axial width is significantly larger than the axial width of the torsion webs 19 received therein are generated in the context of the production of a functional group which comprises this component and the components received within the associated bearing sleeve 14, including a pivot ring 15. As is the case in the functional group according to FIGS. 2 to 4, the delimitation faces 33 which delimit these openings 32 in the axial direction, are accordingly disposed so as to be spaced apart from the respective torsion webs 19 received therein. The production of a functional group comprising the component according to FIG. 8 takes place in the manner as has been described for the functional group according to FIGS. 6 and 7.

Figure 5:
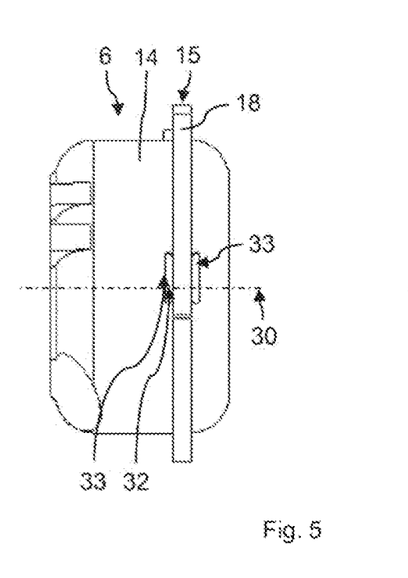
FIG. 5 shows in a lateral view a fixed bearing of the functional group according to FIGS. 2 to 4 in a separate design embodiment.
Figure 9:
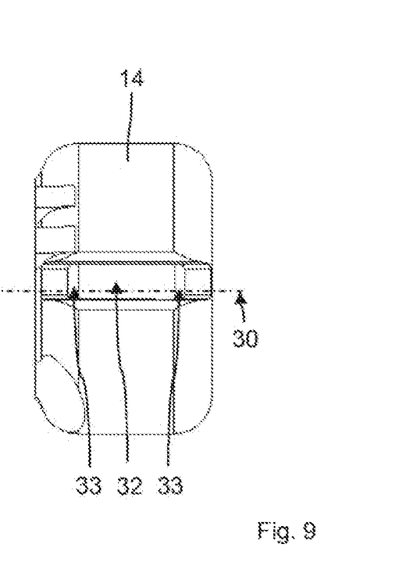
FIG. 9 shows in a lateral view a bearing sleeve corresponding to the bearing sleeve according to FIG. 8 in a separate design embodiment.

The design embodiment according to the disclosure of a fixed bearing 6 is also able to be implemented in such fixed bearings 6 in which the bearing sleeve 14 is not connected to a connection element 28, or is not configured so as to be integral with the connection element 28, respectively. FIGS. 5 and 9 show separate bearing sleeves 14 for such fixed bearings 6 which in terms of construction and also in terms of the manner in which they have been produced, otherwise correspond to those according to FIGS. 2 to 4, or according to FIG. 8, respectively.

LIST OF REFERENCE SIGNS

1 Housing
2 Gear wheel
3 (Helical) pinion
4 (Helical) pinion shaft
5 Output shaft of the steering gear
6 Fixed bearing
7 Pivot axis
8 Floating bearing
9 Ball bearing
10 Inner bearing ring of a ball bearing
11 Outer bearing ring of a ball bearing
12 Bearing device of the fixed bearing
13 Bearing device of the floating bearing
14 Bearing sleeve
15 Pivot ring
16 Inner ring of the pivot ring
17 Ring element
18 Outer ring of the pivot ring
19 Torsion web
20 Pressure piece
21 Screw
22 Screw ring
23 Detent sleeve
24 Receptacle space
25 Detent element
26 First shoulder of the bearing sleeve
27 Second shoulder of the bearing sleeve
28 Connection element
29 Casing opening
30 Longitudinal axis of the connection element, of the bearing sleeve, of the ball bearings, of the ring elements, and of the pinion shaft
31 Reinforcement rib
32 Opening in the bearing sleeve
33 Delimitation face of an opening in the bearing sleeve
34 Depression of the bearing sleeve

The invention claimed is:

1. A steering gear for a steering system of a motor vehicle, comprising:
a housing;
a gear wheel;
a pinion which meshes with the gear wheel; and
a pinion shaft which comprises the pinion,
wherein:
the pinion shaft on a first side of the pinion is mounted in a fixed bearing which comprises a rotary bearing in which the pinion shaft is received and which is received in a bearing sleeve of plastics material,
the fixed bearing furthermore has a pivot ring which has an outer ring and an inner ring which by way of a plurality of torsion webs are pivotably connected to one another, the inner ring received in the bearing sleeve and the outer ring mounted within the housing,
the torsion webs extend in each case through an opening in the bearing sleeve, the opening delimited by a plurality of delimitation faces,
at least one delimitation face of the plurality of delimitation faces, which in terms of a longitudinal axis of the bearing sleeve delimits the opening in the axial direction, is disposed so as to be spaced apart from the torsion web received in the opening, and
a void defined between the torsion web and the at least one delimitation face is filled with a material which is dissimilar to the material of the bearing sleeve.

2. The steering gear as claimed in claim 1, wherein the at least one delimitation face has a radial width which is smaller than the mean radial width of the bearing sleeve in a cross-section taken perpendicular to the axial direction and in which the at least one delimitation face lies.

3. A steering gear for a steering system of a motor vehicle, comprising:
- a housing;
- a gear wheel;
- a pinion which meshes with the gear wheel; and
- a pinion shaft which comprises the pinion, wherein:
- the pinion shaft on a first side of the pinion is mounted in a fixed bearing which comprises a first rotary bearing in which the pinion shaft is received and which is received in a bearing sleeve of plastics material,
- the fixed bearing furthermore has a pivot ring which has an outer ring and an inner ring which by way of a plurality of torsion webs are pivotably connected to one another, the inner ring received in the bearing sleeve and the outer ring mounted within the housing,
- the torsion webs extend in each case through an opening in the bearing sleeve, the opening delimited by a plurality of delimitation faces,
- at least one delimitation face of the plurality of delimitation faces, which in terms of a longitudinal axis of the bearing sleeve delimits the opening in the axial direction, (i) is disposed so as to be spaced apart from the torsion web received in the opening and/or (ii) has a radial width which is smaller than the mean radial width across a circumference of that axial portion of the bearing sleeve in which the at least one delimitation face lies,
- the pinion shaft on a second side of the pinion is mounted in a floating bearing which comprises a second rotary bearing in which the pinion shaft is received,
- radial mobility within the housing is guaranteed for the second rotary bearing, and
- the bearing sleeve and/or a first outer bearing ring of the first rotary bearing of the fixed bearing is connected to a second outer bearing ring of the floating bearing by way of a connection element.

4. The steering gear as claimed in claim 3, wherein the connection element in at least one longitudinal portion has an opening into which the gear wheel protrudes.

5. The steering gear as claimed in claim 3, wherein the connection element and the bearing sleeve are configured in one piece and so as to be materially integral.

6. The steering gear as claimed in claim 3, wherein the first rotary bearing of the floating bearing is mounted within a portion of the connection element.

7. A method for producing a steering gear that includes a housing, a gear wheel, a pinion which meshes with the gear wheel, and a pinion shaft which comprises the pinion, the pinion shaft on a first side of the pinion mounted in a fixed bearing which comprises a rotary bearing in which the pinion shaft is received and which is received in a bearing sleeve, the method comprising:

forming at least the bearing sleeve from plastics material by injection molding; and integrating a pivot ring of the fixed bearing into the bearing sleeve by partial overmolding, the pivot ring having an outer ring and an inner ring which by way of a plurality of torsion webs are pivotably connected to one another, the inner ring received in the bearing sleeve and the outer ring mounted within the housing.

8. A method for producing a steering gear that includes a housing, a gear wheel, a pinion which meshes with the gear wheel, and a pinion shaft which comprises the pinion, the pinion shaft on a first side of the pinion mounted in a fixed bearing which comprises a rotary bearing in which the pinion shaft is received and which is received in a bearing sleeve, the method comprising:

forming at least the bearing sleeve from plastics material by injection molding, wherein the bearing sleeve is demolded in the axial direction, and wherein (i) a spacing between the torsion webs and at least one delimitation face of a respective associated opening of the bearing sleeve is configured by a radially movable slide of an injection-molding tool or by a casting core from a material which is dissimilar to the material of the bearing sleeve and/or (ii) a relatively small radial width of the at least one delimitation face is configured by a correspondingly dimensioned cavity of the injection-molding tool.

\* \* \* \* \*

UNITED STATES PATENT AND TRADEMARK OFFICE
CERTIFICATE OF CORRECTION

| | | |
|---|---|---|
| PATENT NO. | : 11,447,172 B2 | |
| APPLICATION NO. | : 17/055751 | |
| DATED | : September 20, 2022 | |
| INVENTOR(S) | : Hafermalz et al. | |

It is certified that error appears in the above-identified patent and that said Letters Patent is hereby corrected as shown below:

On the Title Page

On Page 2, under Item (56) References Cited, in Line 5 under the subheading FOREIGN PATENT DOCUMENTS: "GN 106321783 A" should read --CN 106321783 A--.

Signed and Sealed this
Twenty-eighth Day of March, 2023

Katherine Kelly Vidal
*Director of the United States Patent and Trademark Office*